(12) United States Patent
Yasuda

(10) Patent No.: US 8,052,154 B2
(45) Date of Patent: Nov. 8, 2011

(54) METAL LAMINATE GASKET

(75) Inventor: Kishou Yasuda, Adachi-ku (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 906 days.

(21) Appl. No.: 11/524,306

(22) Filed: Sep. 21, 2006

(65) Prior Publication Data

US 2007/0069482 A1 Mar. 29, 2007

(30) Foreign Application Priority Data

Sep. 27, 2005 (JP) ................................ 2005-279293

(51) Int. Cl.
*F02F 11/00* (2006.01)
(52) U.S. Cl. ........................................ 277/593; 277/595
(58) Field of Classification Search .................. 277/591, 277/593, 595, 597–598
See application file for complete search history.

(56) References Cited

U.S. PATENT DOCUMENTS

| | | | | |
|---|---|---|---|---|
| 4,861,046 A | * | 8/1989 | Udagawa | 277/595 |
| 5,169,163 A | * | 12/1992 | Udagawa et al. | 277/593 |
| 6,827,352 B2 | * | 12/2004 | Ueta et al. | 277/593 |
| 2003/0085530 A1 | * | 5/2003 | Miyaoh et al. | 277/593 |
| 2003/0127805 A1 | * | 7/2003 | Stapel | 277/595 |

FOREIGN PATENT DOCUMENTS

JP 3113642 9/2000

* cited by examiner

*Primary Examiner* — Vishal Patel
(74) *Attorney, Agent, or Firm* — Manabu Kanesaka

(57) ABSTRACT

A metal laminate gasket for an engine fitting a cylinder liner into a cylinder block is formed by laminating multiple metal plates, and includes a first laminate portion clamped between the cylinder block and the head block; a second laminate portion clamped between the cylinder liner and the head block; a connecting portion formed between the first and second laminate portions and made thinner than the first and second laminate portions; and a damper bead formed in the connecting portion for allowing the second laminate portion to follow the movements of the cylinder liner. Thus, the metal laminate gasket for the engine with the cylinder liner can follow the intricate movements of the cylinder liner accompanied by a high-powered engine.

3 Claims, 1 Drawing Sheet

METAL LAMINATE GASKET

BACKGROUND OF THE INVENTION AND RELATED ART STATEMENT

The present invention relates to a metal laminate type gasket for an engine with a cylinder liner fitted into a cylinder block.

In an engine with a cylinder liner fitted into a cylinder block, the cylinder liner moves intricately accompanied by a high-powered engine, so that a head block is affected by the intricate movements of the cylinder liner. Accordingly, the cylinder head gasket is also required to follow the intricate movements of the cylinder liner as much as possible.

More specifically, for example, a gasket as shown in Japanese Patent No. 3113642, i.e., as shown in FIG. 2, a gasket forming a sealing portion 42 by folding back a first metal plate 31 at the rim of a combustion chamber 35, and laminating a second metal plate 32 to the first metal plate 31, includes a connecting portion 44 formed by only the first metal plate 31 between a sealing portion 42 and a laminated portion 41 of the first and second metal plates 31, 32. When the connecting portion 44 is located between the cylinder block and the cylinder liner, and the gasket is installed between the cylinder block and the head block, the gasket can follow the intricate movements of the cylinder liner to a certain extent.

However, when the cylinder liner moves intricately in a direction of the axis line of the cylinder liner relative to the cylinder block, the force of expanding and contracting in a horizontal direction in FIG. 2 acts on the connecting portion 44. Even if a bead 31a is provided in the sealing portion 42 of the first metal plate 31 as shown in FIG. 2, the bead 31a is highly compressed between the cylinder liner and the cylinder head for sealing. As a result, the bead 31a cannot act shock-absorbingly relative to the above-mentioned force. Also, when the bead 31a forcefully acts, the sealing function of the sealing portion 42 is deteriorated.

An object of the invention is to provide the metal laminate type gasket for the engine constituted by fitting the cylinder liner into the cylinder block, in such a way as to be able to follow intricate movements of the cylinder liner accompanied by the high-powered engine.

Further objects and advantages of the invention will be apparent from the following description of the invention.

SUMMARY OF INVENTION

In order to solve the above-mentioned object, a metal laminate type gasket of the invention is made for an engine constituted by fitting a cylinder liner into a cylinder block, and formed by laminating multiple metal plates. The metal laminate type gasket includes a first laminated portion clamped between the cylinder block and the head block; a second laminated portion clamped between the cylinder liner and the head block; a connecting portion formed between the first and second laminated portions and made thinner than the first and second laminated portions; and a damper bead formed in the connecting portion for allowing the second laminated portion to follow the movements of the cylinder liner.

In a preferred embodiment of the metal laminate type gasket of the present invention, the second laminated portion is formed by folding back the first metal plate at the rim of the combustion chamber. Also, the first laminated portion is formed by interposing the connecting portion between the first metal plate and the second laminated portion, and laminating at least one sheet of the second metal plate. In addition, a shim for adjusting the thickness is clamped in the folded portion of the rim of the combustion chamber of the first metal plate.

In another preferred embodiment of the metal laminate type gasket of the present invention, a damper bead of the connecting portion is formed by a bead with a shape which is not affected by the tightening force between the cylinder block including the cylinder liner and the head block. Also, the damper bead provided in the connecting portion of the first metal plate projects to the second metal plate laminated in the first metal plate, and is formed by the bead which is located lower than the thickness of the second metal plate.

In the metal laminate type gasket with the above-mentioned structure, the damper bead is provided in the connecting portion. When the cylinder block including the cylinder liner and the head block is tightened, the damper bead is made in such a way not to be compressed between the cylinder block and the head block. Accordingly, the movements of the damper bead are not restricted by the tightening. Therefore, even if the cylinder liner moves intricately, the second laminated portion clamped by the cylinder liner follows the movements of the cylinder liner well, so that the sealing function is never deteriorated.

Also, the damper bead of the first metal plate is not compressed by the cylinder block and the head block when the cylinder block and the head block are tightened. Accordingly, even if the damper bead is provided, when the gasket is tightened, the gasket only needs to be tightened by the same force as in the case where the damper bead is not provided. Also, the tightening force does not need to be adjusted by the presence or absence of the damper bead.

According to the metal laminate type gasket of the invention described above, the metal laminate type gasket for an engine constituted by fitting the cylinder liner into the cylinder block can follow the intricate movements of the cylinder liner accompanied by a high-powered engine.

DETAILED DESCRIPTION OF PREFERRED EMBODIMENTS

Hereinafter, embodiments of a metal laminate type gasket of the present invention will be explained in detail with reference to the drawings.

Figure 1:
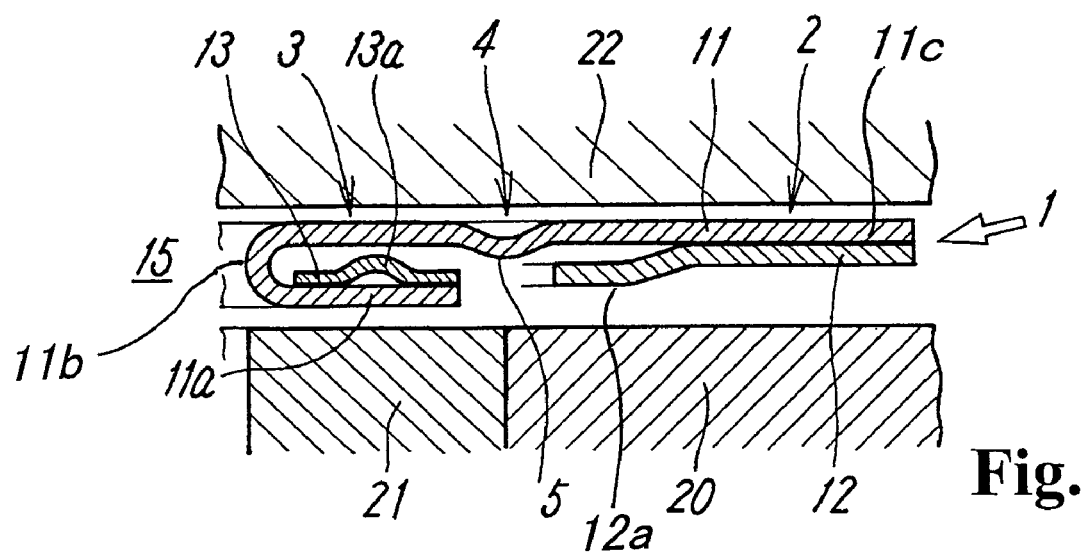
FIG. 1 is an enlarged vertical cross-sectional view of an essential component showing an embodiment wherein a metal laminate type gasket according to the invention is installed in an engine (un-compression state of a head block)
Figure 2:
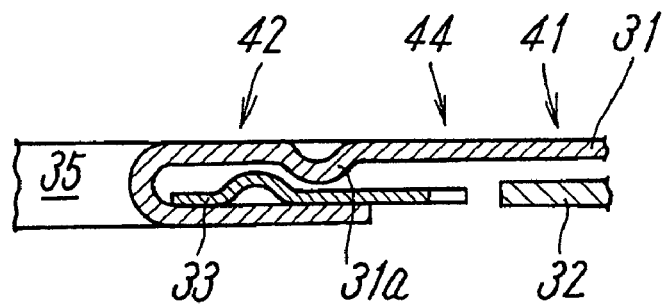
FIG. 2 is a vertical cross-sectional view of the essential component of the metal laminate type gasket heretofore known.

FIG. 1 shows an embodiment, wherein a metal laminate type gasket of the invention is installed in an engine, and a position adjacent to a cylinder bore is shown by an enlarged cross-section.

A metal laminate type gasket 1 is a gasket for the engine constituted by fitting a cylinder liner 21 into a cylinder block 20. Generally, the metal laminate type gasket is formed by laminating multiple metal plates. However, in this case, the metal laminate type gasket is constituted by a first metal plate 11, a second metal plate 12, and a shim 13 for adjusting the thickness, as an example.

In the metal laminate type gasket 1, a connecting portion 4 is formed between a first laminated portion 2 clamped between the cylinder block 20 and a head block 22; and a second laminated portion 3 clamped between the cylinder liner 21 and the head block 22. The connecting portion 4 is thinner than the laminated portions 2, 3. A damper bead 5 is formed in the connecting portion 4, and allows the second laminated portion 3 to follow the movements of the cylinder liner 21.

More specifically, in the metal laminate type gasket 1, the second laminated portion 3 is formed by folding back the first metal plate 11 at the rim of a combustion chamber 15. Also, at least one second metal plate 12 is laminated on a part of the first metal plate 11 to form the first laminated portion 2. Namely, the first metal plate 11 includes a base portion 11c, a curved portion 11b and a flange or folded back portion 11a. The second metal plate is laminated under a part of the base portion 11c. The first metal plate 11 includes the connecting portion 4 between the first laminated portion 2 and the second laminated portion 3.

Also, the shim 13 for adjusting the thickness is clamped in the folded portion 11a at the rim of the combustion chamber 15 of the first metal plate 11. Incidentally, numeral 13a represents a sealing bead provided in the shim 13.

The damper bead 5 at the connecting portion 4 is formed with a shape which is not affected by the tightening force between the cylinder block 20 including the cylinder liner 21 and the head block 22. Specifically, the damper bead 5 of the first metal plate 11 projects to the second metal plate 12 laminated on the first metal plate 11, and is formed by the bead which is lower than the thickness of the second metal plate 12. As a result, when the head block 22 is tightened, the damper bead 5 does not contact other metal plates, cylinder block 20, cylinder liner 21 and so on. Incidentally, the second metal plate 12 has a half bead 12a to provide a sealing pressure relative to the cylinder block 20.

In the metal laminate type gasket 1 with the above-mentioned structure, the damper bead 5 is provided in the connecting portion 4, and when the cylinder block 20 including the cylinder liner 21 and the head block 22 are tightened, the damper bead 5 is made in such a way not to be compressed between the cylinder block 20 and the head block 22. Accordingly, the movements of the damper bead 5 are never restricted by the tightening, so that even if the cylinder liner 21 moves intricately, the second laminated portion 3 clamped by the cylinder liner 21 follows the movements of the cylinder liner 21 well. As a result, the sealing function is never deteriorated.

Also, when the cylinder block 20 and the head block 22 are tightened, the damper bead 5 of the first metal plate 11 is not compressed by the cylinder block 20 and the head block 22. Accordingly, even if the damper bead 5 is provided, when the gasket is tightened, the gasket needs to be tightened only by the same force as in the case where the damper bead 5 is not provided. The tightening force does not need to be adjusted by the presence or absence of the damper bead 5, and the head block 22 is always tightened enough.

In the above embodiment, only the structure around the cylinder chamber is explained. The gasket may have any structure in the portion other than the structure around the cylinder chamber.

The disclosure of Japanese Patent Application No. 2005-279293 filed on Sep. 27, 2005 is incorporated herein as a reference.

While the invention has been explained with reference to the specific embodiments of the invention, the explanation is illustrative and the invention is limited only by the appended claims.

What is claimed is:

1. A combination comprising:
   an engine having a head block, a cylinder liner and a cylinder block, and
   a metal laminate gasket installed in the engine, said metal laminate gasket comprising:
   a first metal plate including a base portion, a curved portion extending from the base portion to define a combustion chamber, a flange extending from the curved portion in a direction away from the combustion chamber, and a damper bead formed in the base portion and located entirely outside the flange,
   a second metal plate laminated with the base portion outside the flange so that the damper bead is located between the second metal plate and the flange, and
   an annular shim formed independently from the first and second metal plates and clamped only between the flange and the base portion without extending outside the flange,
   wherein a part of the base portion outside the damper bead and the second metal plate form a first laminate portion clamped between the cylinder block and the head block,
   the flange, a part of the base portion above the flange and the shim form a second laminate portion clamped between the cylinder liner and the head block, and
   the damper bead forms a connecting portion between the first and second laminate portions for allowing the second laminate portion to follow movements of the cylinder liner.

2. A combination according to claim 1, wherein said damper bead projects to the second metal plate, and has a height less than a thickness of the second metal plate.

3. A combination according to claim 2, wherein said second metal plate includes a half bead surrounding the flange.

* * * * *